United States Patent Office 3,167,568
Patented Jan. 26, 1965

3,167,568
PROCESS FOR PRODUCING Δ⁴-PREGNEN-11α,17α-DIOL-3,20-DIONE AND INTERMEDIATES THEREIN
Carl Djerassi, Birmingham, Mich., and George Rosenkranz, Mexico City, Mexico, assignors, by mesne assignments, to Syntex Corporation, a corporation of Panama
No Drawing. Filed Sept. 5, 1956, Ser. No. 607,985
Claims priority, application Mexico Mar. 7, 1952
9 Claims. (Cl. 260—397.45)

The present invention relates to novel cyclopentanophenanthrene derivatives and to a method for the preparation thereof.

More particularly, the present invention relates to ring A unsaturated compounds of the pregnne and allopregnen series having 17α and 21-hydroxy groups and 3, 11 and 20-keto groups, as well as to esters thereof.

In accordance with the present invention, it has been discovered that allopregnan-11α,17α-diol-3,20-dione and its esters and 16α,17α-oxido-allopregnan-11α,ol-3,20-dione may be converted into the novel Δ¹-allopregnen-11α,17α-diol-3,20-dione and esters thereof, the corresponding Δ¹,⁴-analogs and the corresponding Δ⁴-pregnen compounds. In accordance with the present invention, there has been further discovered that the aforementioned starting materials may be converted into certain novel bromo compounds as well as other certain novel intermediates for the production of the final compounds referred to.

The products of the present novel process just referred to have therapeutic hormone activity, especially of the type characterizing the adrenal cortical steroids. Further, since the 11α-hydroxy group of these compounds may be readily oxidized with chromic acid for example and the compounds may also be provided with the 21-acetoxy group by conventional methods such as treatment with lead tetraacetate, they are also intermediates for the production of corresponding ring A unsaturated pregnane compounds. These ring A unsaturated compounds, i.e., Δ¹-allopregnen-17α,21-diol-3,11,20-trione and the esters thereof and Δ¹,⁴-pregnadien-17α,21-diol-3,11,20-trione and the esters thereof are valuale cortical hormones having the 3, 11 and 20-ketone groups and the 17α and 21-hydroxy groups and can further be converted by hydrogenation to the corresponding ring A saturated allopregnan-17α,21-diol-3,11,20-trione. This last compound can be reduced as by lithium aluminum hydride to the corresponding pentol and cortical hormone, i.e., Reichstein's Substance A.

The following equation serves to illustrate a portion of the present invention:

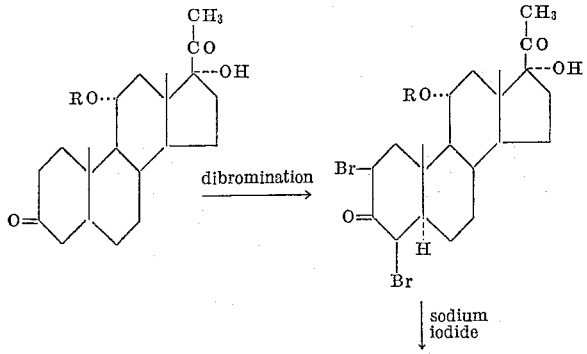

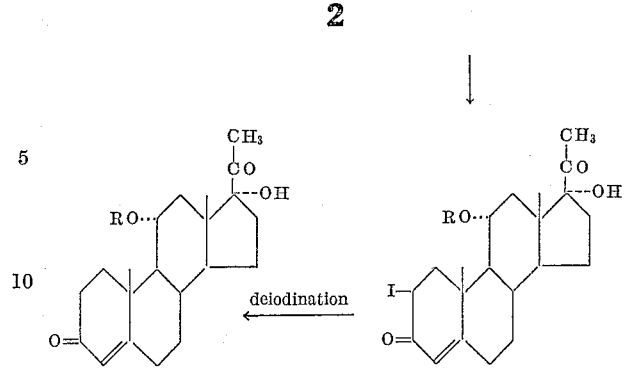

In the above equation, R preferably represents an acyl group, i.e., the residue of an organic acid conventionally used for the esterification of steroid alcohols. More particularly, R represents the residue of a lower fatty acid such as acetic or propionic or the residue of an aromatic acid such as benzoic. R may also represent hydrogen.

In practicing the process above outlined, an 11-monoester of allopregnan-11α,17α-diol-3,20-dione prepared in accordance with our United States application, Serial No. 337,431, filed February 17, 1953, now U.S. Patent No. 2,773,887, dissolved in a suitable solvent, such as glacial acetic acid, is treated with 2 molar equivalents of bromine in acetic acid in the presence of a catalytic amount of hydrogen bromide. Preferably, during the addition of the bromine in acetic acid which took approximately 15 minutes, the temperature of the mixture is kept at room temperature. After standing for a suitable length of time, in order to complete the rearrangement of the 2,2'-dibromo compound first formed, into the more stable 2,4-dibromo derivative, the solution is diluted with water and the precipitate suitably purified.

The 2,4-dibromo derivative thus produced is then treated with sodium iodide in the presence of a lower aliphatic ketone solvent or with an equivalent alkali metal iodide to prepare the corresponding 2-iodo-Δ⁴-compound. The 2-iodo-Δ⁴-compound is then subjected to treatment with a deiodinating agent, as for example, chromous chloride, sodium bisulfite, or a tertiary amine such as collidine or dimethylaniline or with a dehalogenating agent such as Raney nickel. The resultant 11-monoester of Δ⁴-pregnen-11α,17α-diol-3,20-dione can then be readily converted into the free compound by conventional saponification.

The same compounds just referred to can be prepared by another method which is illustrated by the following equation:

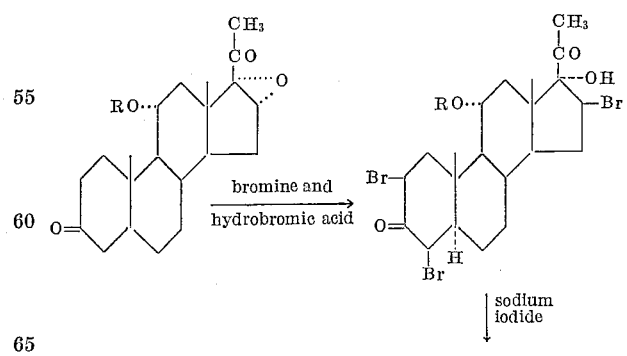

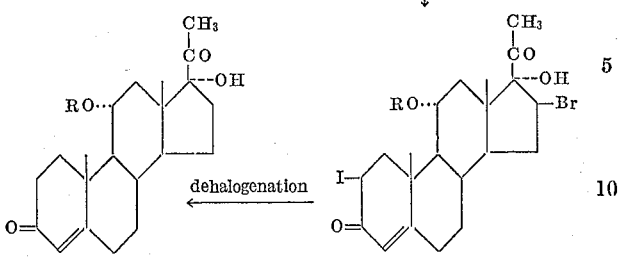

In the above equation, R represents the same groups as hereinbefore set forth.

It will be noted that the process in general is quite similar to the first process outlined. The starting material, however, is the corresponding 16α,17α-oxido compound, instead of the 17α-hydroxy compound. This compound is also disclosed in the aforementioned United States application. The oxido compound is treated with bromine and with an excess of hydrobromic acid, preferably, in the presence of glacial acetic acid. The resultant compound is the 2,4,16-tribromo-17α-hydroxy derivative. Upon treating this last derivative with sodium iodide, the corresponding 2-iodo-Δ⁴-compound is produced. This compound may then be dehalogenated in a single step by using a dehalogenating agent such as Raney nickel. In the alternative, it may be first treated with a deiodinating agent, such as the deiodinating agents previously mentioned and, thereafter, treated with a dehalogenating (debrominating) agent such as Raney nickel. The final compound produced is the same as heretofore, namely, an 11-monoester of Δ⁴-pregnen-11α,17α-diol-3,20-dione.

The brominated derivatives of allopregnan-11α,17α-diol-3,20-dione and/or its esters, may be utilized for the production of novel ring A unsaturated steroids such as the corresponding Δ¹ and Δ¹,⁴-derivatives, in accordance with the following equations:

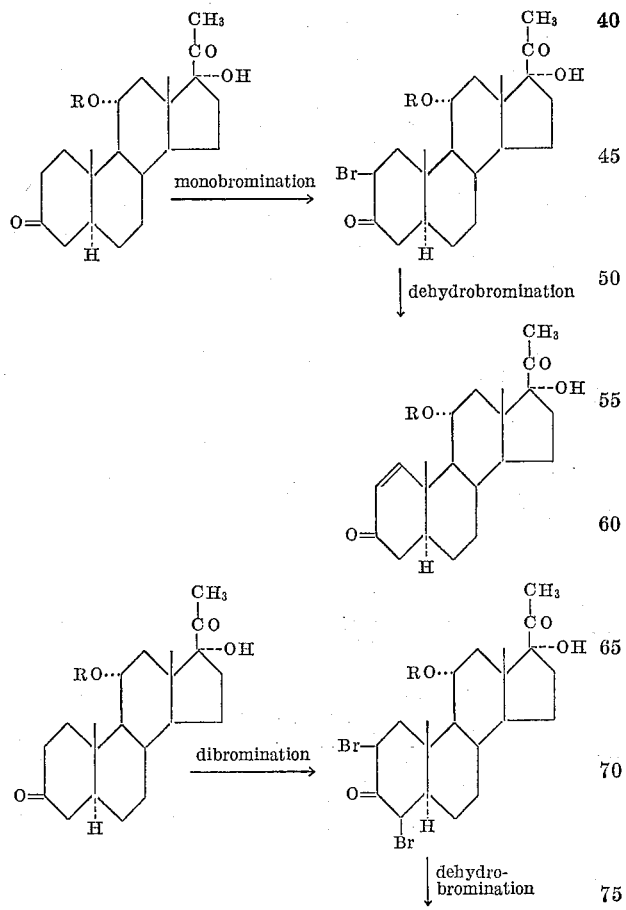

In the above equations, R represents the same groups as heretofore set forth.

In proceeding in accordance with the above equations, the starting material which may be a suitable ester, such as the 11-monoacetate of allopregnan-11α,17α-diol-3,20-dione, is treated either with one molar equivalent of bromine or two molar equivalents, depending upon whether the 2-bromo derivative is desired or the 2,4-dibromo derivative. Thereafter, these bromo derivatives are subjected to dehydrobromination by treatment with the dehydrobrominating agent, i.e., a tertiary amine, such as lutidine or collidine, or by formation of the corresponding dinitrophenylhydrazone or semicarbazone, which is, thereafter, subjected to cleavage with a suitable agent, such as pyruvic acid.

The following specific examples serve to illustrate, but are not intended to limit the present invention:

Example I

A solution of 1 g. of allopregnan-11α,17α-diol-3,20-dione acetate in 60 cc. of glacial acetic acid was mixed with three drops of a 4-normal solution of hydrogen bromide in acetic acid and the mixture was treated dropwise and under mechanical stirring with a solution of 1.05 molar equivalents of bromine in acetic acid. After the solution had decolorized completely, water was added and the precipitate was filtered, washed with water and air dried. The product was 2-bromo-allopregnan-11α,17α-diol-3,20-dione acetate.

Example II

A solution of 1 g. of the 2-bromo derivative obtained according to Example I in 7 cc. of gamma-collidine was refluxed for 45 minutes. The mixture was cooled and the precipitate of collidine hydrobromide formed was filtered (its weight corresponded to 0.97 molar equivalent) and washed with ether. The filtrate was diluted with more ether and then washed with dilute hydrochloric acid, sodium carbonate and water, dried over sodium sulphate and evaporated to dryness. In order to purify the compound, it was dissolved in a mixture of benzene-hexane and passed through a column with 3 g. of alumina previously washed with ethyl acetate. Recrystallization from ethyl acetate yielded Δ¹-allopregnen-11α,17α-diol-3,20-dione acetate.

In the above experiment, gamma-collidine can be substituted by 2,6-lutidine, giving the same results.

By refluxing the acetate with 1% alcoholic potassium hydroxide for 1 hour under an atmosphere of nitrogen and working up under the usual conditions, Δ¹-allopregnen-11α,17α-diol-3,20-dione was obtained.

Example III

A solution of 1 g. of the 2-bromo derivative obtained according to Example I, 0.75 g. of semicarbazide and 0.8 g. of sodium acetate trihydrate (previously dissolved in 0.5 cc. of water) in 150 cc. of acetic acid was maintained at a temperature of 60° under an atmosphere of nitrogen during 2 hours. After this time, 10 cc. of pyruvic acid, 3 g. of sodium acetate and 20 cc. of water were added and the temperature of the mixture was raised to 75°. After 2 hours, 4 additional cc. of pyruvic acid were added and the mixture was kept standing overnight. Next day it was diluted with much water and the precipitate was extracted with chloroform, washed with sodium bicarbonate and water, dried over sodium sulphate and evaporated to dryness, thus giving $\Delta^1$-allopregnen-11$\alpha$,17$\alpha$-diol-3,20-dione acetate identical to the one obtained according to Example II.

*Example IV*

A solution of 2 g. of the 2-bromo derivative obtained acording to Example I and 1.1 molar equivalents of 2,4-dinitrophenyl-hydrazine in 50 cc. of glacial acetic acid was kept at a temperature of 100° C., during 5 minutes. The solution was cooled and the orange dinitrophenylhydrazone formed was filtered and washed with alcohol. A solution of 1 g. of this compound in 50 cc. of chloroform was mixed with 75 cc. of 85% pyruvic acid and 6 cc. of a 4-normal solution of hydrogen bromide in acetic acid and the mixture was heated at 60° during 3 hours under an atmosphere of nitrogen. The solution was diluted with chloroform and water and the chloroform layer was washed with water, sodium carbonate solution and water, dried over sodium sulphate and evaporated to dryness. After one crystallization of the residue from ethyl acetate it gave $\Delta^1$-allopregnen-11$\alpha$,17$\alpha$-diol-3,20-dione acetate identical to the one obtained according to Example II.

*Example V*

A solution of 2 g. of allopregnan-11$\alpha$,17$\alpha$-diol-3,20-dione acetate in 100 cc. of glacial acetic acid containing 5 drops of a 4-normal solution of hydrogen bromide in acetic acid was treated dropwise and under mechanical stirring with a solution of 2 molar equivalents of bromine in 5 cc. of acetic acid. The addition took approximately 15 minutes and during this time the temperature of the mixture was kept at 20°. At the end of this time, 1 more cc. of the hydrogen bromide solution was added and the mixture was kept overnight in order to complete the rearrangement of the 2,2'-dibromo configuration into the more stable 2,4-dibromo configuration. The solution was then diluted with water and the precipitate of 2,4-dibromo-allopregnan-11$\alpha$,17$\alpha$-diol-3,20-dione acetate was filtered, washed with water and air dried.

*Example VI*

A solution of 1 g. of the 2,4-dibromo compound obtained according to Example V in 8 cc. of collidine was refluxed for 40 minutes and then treated according to the method described in Example II. The product was crystallized from ethyl acetate to give $\Delta^{1,4}$-pregnadien-11$\alpha$,17$\alpha$-diol-3,20-dione.

Saponification by the method described in Example II yielded the free $\Delta^{1,4}$-pregnadien-11$\alpha$,17$\alpha$-diol-3,20-dione.

$\Delta^{1,4}$-pregnadien-11$\alpha$,17$\alpha$-diol-3,20-dione was treated with a slight excess over the calculated amount of chromic acid ($CrO_3$) in pyridine solution. For the reaction, the reacting components were mixed at 0° and the reaction mixture was maintained at 0° C. for 2 hours and then at room temperature for 5 hours. The mixture was then poured into ice and water and extracted with chloroform. The chloroform solution was washed with dilute hydrochloric acid to remove the pyridine and then the water. The solution was then dried over sodium sulphate and evaporated to dryness to give $\Delta^{1,4}$-pregnadien-17$\alpha$-ol-3-11,20-trione.

A solution of 0.5 g. of the aforementioned trione in 20 cc. of acetic acid was treated with 0.7 g. of lead tetraacetate for 4 hours at 50 to 60° C. and then poured into water. The product was then extracted with chloroform. The chloroform solution was washed with water, dried over sodium sulphate, evaporated to dryness and the product purified by chromatography to give the 21-acetate of $\Delta^{1,4}$-pregnadien-17$\alpha$,21-diol-3,11,20-trione. Conventional saponification with alkali gave the free $\Delta^{1,4}$-pregnadien-17$\alpha$,21-diol-3,11,20-trione and conventional esterification with acid anhydrides and/or chlorides gave the usual hydrocarbon carboxylic esters of less than nine carbon atoms such as the 21-propionate, butyrate, benzoate, etc.

*Example VII*

A solution of 3 g. of the 2,4-dibromo derivative obtained according to Example V in 100 cc. of acetone (or methyl-ethyl-ketone) was refluxed during 20 hours with 3.6 g. of sodium iodide. The mixture was cooled, diluted with ether and washed with water, sodium thiosulphate solution, sodium bicarbonate and water. The ether solution was dried over sodium sulphate and evaporated to dryness under reduced pressure leaving as a residue the crude 2-iodo-$\Delta^4$-pregnen-11$\alpha$,17$\alpha$-diol-3,20-dione acetate.

*Example VIII*

A solution of 1.5 g. of the crude 2-iodo-$\Delta^4$-pregnen-11$\alpha$,17$\alpha$-diol-3,20-dione acetate in 200 cc. of acetone was treated under an atmosphere of carbon dioxide with a solution of chromous chloride prepared from 12 g. of chromic chloride by the method described by Dosenkranz, Mancera, Gatica and Djerassi, J. Am. Chem. Soc., 72, 4077 (1950). The solution was kept at room temperature for 15 minutes and then it was diluted with water, extracted with ether, washed with sodium bicarbonate and water, dried over sodium sulphate and concentrated to a small volume until the product started to crystallize. After cooling, the product was filtered and recrystallized from acetone-hexane to give $\Delta^4$-pregnen-11$\alpha$,17$\alpha$-diol-3,20-dione acetate with a melting point of 206°–208° C., $[\alpha]_D$ +75° (chloroform).

Saponification by the method described in Example II yielded $\Delta^4$-pregnen-11$\alpha$,17$\alpha$-diol-3,20-dione with a melting point of 215°–218° C., $[\alpha]_D$ +87.88° (chloroform).

*Example IX*

1 g. of the iodo compound obtained according to Example VII in 10 cc. of collidine was refluxed for 30 minutes and the cooled solution was diluted with ether and washed with dilute hydrochloric acid and water, dried over sodium sulphate and evaporated to dryness leaving as residue a product identical to the one obtained according to Example VIII. In this reaction, collidine can be substituted by 2,6-lutidine or dimethylaniline.

The Raney nickel treatment such as described in Example X can also be applied with the same results.

*Example X*

A solution of 1 g. of 16$\alpha$,17$\alpha$-oxido-allopregnan-11$\alpha$-ol-3,20-dione acetate in 60 cc. of glacial acetic acid was treated with 1 cc. of a 4-normal solution of hydrogen bromide in acetic acid, and after 10 minutes a solution of 2 molar equivalents of bromine in 35 cc. of acetic acid was added dropwise in a period of 20 minutes. One additional cc. of the hydrogen bromide solution was added and the mixture was kept standing during 8 hours at room temperature and then it was diluted with water. The precipitate was collected, washed with water and dried in the air. The 2,4,16-tribromo-allopregnan-11$\alpha$,17$\alpha$-diol-3,20-dione acetate thus obtained was treated with sodium iodide in acetone (or methyl-ethyl-ketone) by the method described in Example VII. This reaction yielded 2-iodo-16-bromo-$\Delta^4$-pregnen-11$\alpha$,17$\alpha$-diol-3,20-dione acetate. This compound was refluxed during 5 hours in alcohol solution with 10 times its weight of Raney nickel. After removing the catalyst the solution was evaporated to dryness and in order to purify the product it was dissolved in a mixture of benzene-hexane and passed through a short column with alumina previously washed with ethyl acetate. Recrystallization from acetone-hexane afforded $\Delta^4$-pregnen-11$\alpha$,17$\alpha$-diol-3,20-dione acetate identical to the one obtained according to Example VIII.

The present application is a continuation-in-part of our application, Serial No. 340,897, filed March 6, 1953, now U.S. Patent No. 2,767,199.

We claim:
1. A process for the production of a compound selected from the class consisting of $\Delta^4$-pregnen-11α,17α-diol-3,20-dione and esters thereof which comprises treating a compound selected from the class consisting of 16α,17α - oxido - allopregnan-11α-ol-3,20-dione 11-lower fatty acid esters thereof and the 11-benzoic acid ester thereof with approximately 2 molar equivalents of bromine and with hydrobromic acid to form a compound selected from the class consisting of 2,4,16-tribromo-allopregnan-11α,17α-diol-3,20-dione 11-lower fatty acid esters thereof and the 11-benzoic acid ester thereof, treating said tribromo compound with an alkali metal iodide in the presence of a lower aliphatic ketone to form the corresponding 2-iodo-16-bromo-$\Delta^4$-compound and treating said 2-iodo-16-bromo-$\Delta^4$-compound with a dehalogenating agent.

2. The process of claim 1, wherein the starting material is 16α,17α-oxido-allopregnan-11α-ol-3,20-dione 11-monoacetate and the final product is $\Delta^4$-pregnen-11α,17α-diol-3,20-dione 11-monoacetate.

3. 2,4,16 - tribromo - allopregnan - 11α,17α - diol-3,20-dione 11-monoacetate.

4. $\Delta^1$-allopregnen-11α,17α-diol-3,20-dione.

5. $\Delta^1$-allopregnen-11α,17α-diol-3,20-dione 11-monoacetate.

6. $\Delta^{1,4}$-pregnadien-11α,17α-diol-3,20-dione.

7. $\Delta^{1,4}$-pregnadien - 11α,17α - diol-3,20-dione 11-monoacetate.

8. A new compound selected from the class consisting of 2-iodo-$\Delta^4$-pregnen - 11α,17α - diol-3,20-dione 11-lower fatty acid esters thereof and the 11-benzoic acid ester thereof.

9. 2-iodo-$\Delta^4$-pregnen-11α,17α-diol-3,20-dione 11-monoacetate.

References Cited in the file of this patent
UNITED STATES PATENTS

| | | |
|---|---|---|
| 2,579,479 | Djerassi et al. | Dec. 25, 1951 |
| 2,602,769 | Murray et al. | July 8, 1952 |
| 2,703,805 | Rosenkranz et al. | Mar. 8, 1955 |
| 2,735,855 | Djerassi et al. | Feb. 21, 1956 |
| 2,773,075 | Wilson et al. | Dec. 4, 1956 |

OTHER REFERENCES

Rosenkranz et al.: 72, J.A.C.S., 4077–85 (1950).